(12) United States Patent
Thiel et al.

(10) Patent No.: US 9,417,939 B2
(45) Date of Patent: Aug. 16, 2016

(54) DYNAMIC ESCALATION OF SERVICE CONDITIONS

(75) Inventors: Greg Thiel, Black Diamond, WA (US); Jon Avner, Bellevue, WA (US); Yogesh Bansal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1060 days.

(21) Appl. No.: 13/527,687

(22) Filed: Jun. 20, 2012

(65) Prior Publication Data
US 2013/0346786 A1    Dec. 26, 2013

(51) Int. Cl.
*G06F 11/07* (2006.01)
*G06F 11/30* (2006.01)

(52) U.S. Cl.
CPC ........ *G06F 11/0709* (2013.01); *G06F 11/0781* (2013.01); *G06F 11/3006* (2013.01)

(58) Field of Classification Search
CPC ............ G06F 11/0709; G06F 11/0781; G06F 11/3006
See application file for complete search history.

(56) References Cited

U.S. PATENT DOCUMENTS

| | | | |
|---|---|---|---|
| 6,728,781 B1 | 4/2004 | Aguilera et al. | |
| 6,760,736 B2 | 7/2004 | Waldo et al. | |
| 7,551,552 B2 | 6/2009 | Dunagan et al. | |
| 7,937,619 B2 | 5/2011 | Little | |
| 7,940,695 B1 | 5/2011 | Bahadur et al. | |
| 8,468,114 B2 * | 6/2013 | Lorge | G06N 5/02 703/22 |
| 8,914,499 B2 * | 12/2014 | Houlihan | G06F 9/5072 709/224 |

OTHER PUBLICATIONS

Indranil Gupta, et al.; "On Scalable and Efficient Distributed Failure Detectors;" Aug. 2001; pp. 170-179; http://citeseer.ist.psu.edu/viewdoc/download;jsessionid=3C28A3A9B32A905295573 BDCA8FCC238?doi=10.1.1.133.4379&rep=rep1&type=pdf.

Cisco Systems, Inc.; "Generic Online Diagnostics on the Cisco Catalyst 6500 Series Switch;" Mar. 25, 2009; pp. 1-9; Cisco Systems, Inc.; San Jose, CA; http://www.cisco.com/en/US/prod/collateral/switches/ps5718/ps708/prod_white_paper0900aecd801e659f.html.

Robbert Van Renesse, et al.; "A Gossip-Style Failure Detection Service;" Sep. 1998; pp. 1-16; Department of Computer Science, Cornell Univeristy; Ithaca, NY; http://www.cs.cornell.edu/home/rvr/papers/GossipFD.pdf.

\* cited by examiner

*Primary Examiner* — Benjamin Geib
(74) *Attorney, Agent, or Firm* — Damon Rieth; Doug Barker; Micky Minhas

(57) ABSTRACT

Systems, methods, and software are provided for dynamically escalating service conditions associated with data center failures. In one implementation, a monitoring system detects a service condition. The service condition may be indicative of a failure of at least one service element within a data center monitored by the monitoring system. The monitoring system determines whether or not the service condition qualifies for escalation based at least in part on an access condition associated with the data center. The access condition may be identified by at least another monitoring system that is located in a geographic region distinct from that of the first monitoring system. Upon determining that the service condition qualifies for escalation, the monitoring system escalates the service condition to an escalated condition and initiates an escalated response.

20 Claims, 5 Drawing Sheets

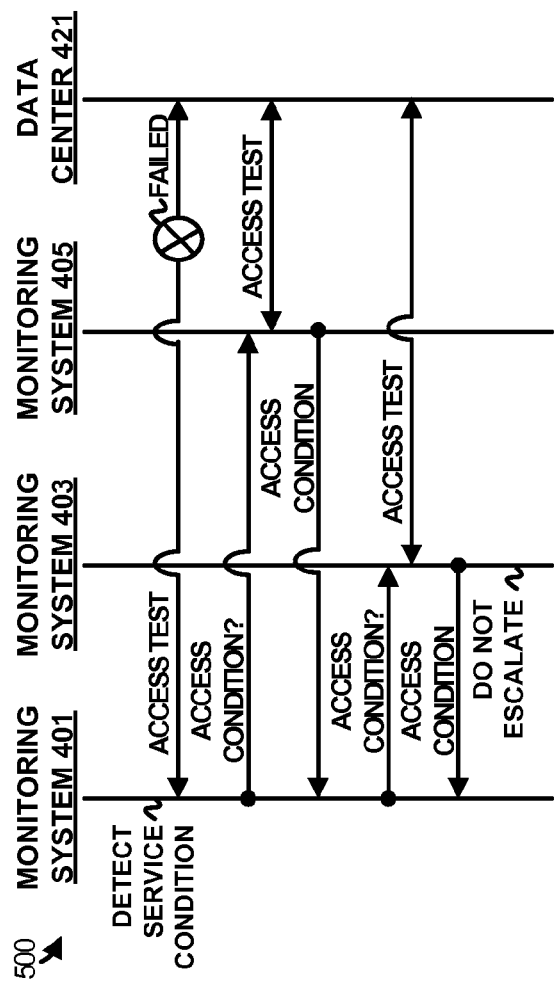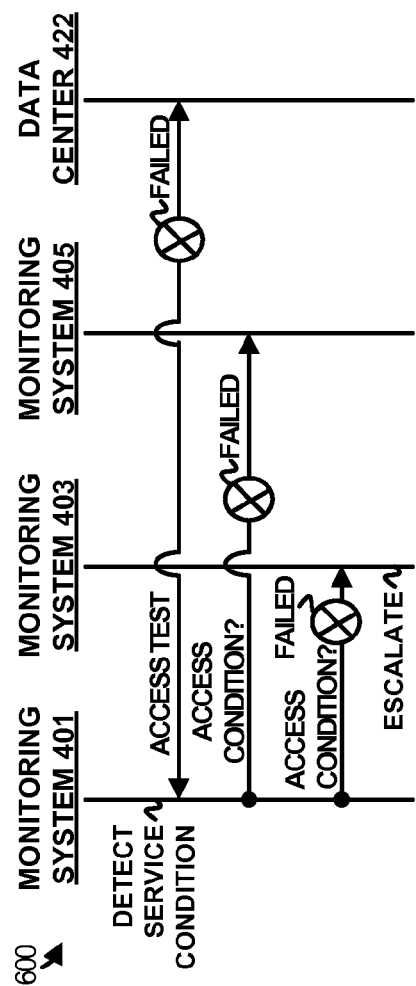

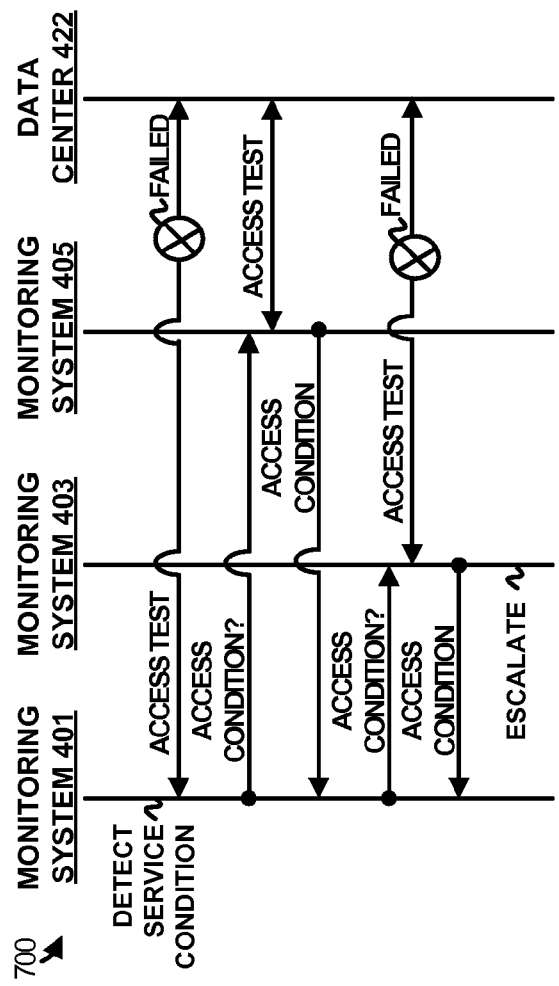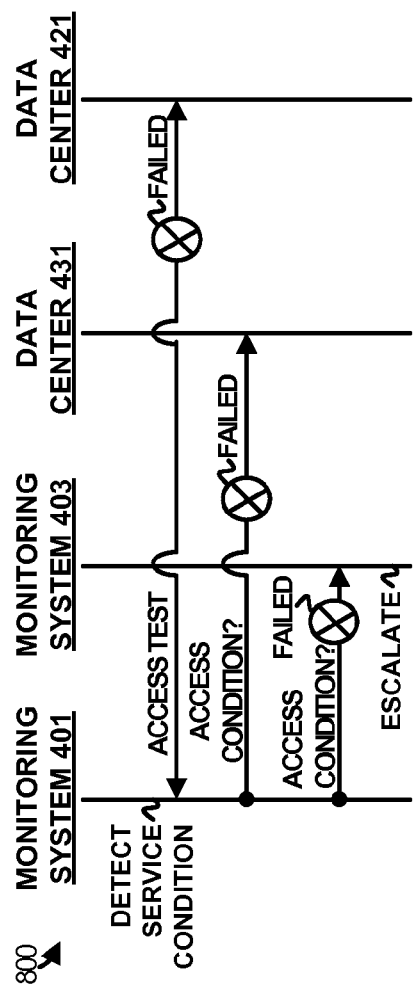

DYNAMIC ESCALATION OF SERVICE CONDITIONS

TECHNICAL FIELD

Aspects of the disclosure are related to computing technologies, and in particular, to data center monitoring and service condition escalation.

TECHNICAL BACKGROUND

Data centers are installations used to host a wide variety of computing applications and associated data, such as email, social networking, search engine, business analytics, productivity, and gaming applications. End users typically engage these applications by way of devices connected to data centers over the Internet, although other was of connecting are possible. With the increase in cloud computing, data centers have become even more prevalent as of late.

Most data centers are housed in facilities with redundant communication links, power supplies, and other infrastructure elements, that allow for nearly continuous operation. Nevertheless, sophisticated monitoring systems are often employed to monitor data center operations. In many situations, monitoring systems external to the data centers communicate with service elements installed within, such hardware or software resources, to report on the status of service elements, including when they fail. Some monitoring systems provide for the automated repair or recovery of failed service elements.

However, some failures require the attention of staff personnel to varying degrees. For example, when a repair or recovery operation is unsuccessful with respect to a failed service element, staff may be alerted to address the failure manually. When those failures occur, staff can be notified accordingly by way of emails, pages, phone calls, or the like. Large scale failures, such as a regional power outage or natural disaster, may inhibit communication between the monitoring systems and the service elements within a data center, causing associated personnel to be notified.

OVERVIEW

Provided herein are systems, methods, and software for dynamically escalating service conditions associated with data center failures. In one implementation, a monitoring system detects a service condition. The service condition may be indicative of a failure of at least one service element within a data center monitored by the monitoring system. The monitoring system determines whether or not the service condition qualifies for escalation based at least in part on an access condition associated with the data center. The access condition may be identified by at least another monitoring system that is located in a geographic region distinct from that of the monitoring system. Upon determining that the service condition qualifies for escalation, the monitoring system escalates the service condition to an escalated condition and initiates an escalated response.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 illustrates a sequence diagram pertaining to the operation of a monitoring environment in an implementation.

FIG. 6 illustrates a sequence diagram pertaining to the operation of a monitoring environment in an implementation.

FIG. 7 illustrates a sequence diagram pertaining to the operation of a monitoring environment in an implementation.

FIG. 8 illustrates a sequence diagram pertaining to the operation of a monitoring environment in an implementation.

TECHNICAL DISCLOSURE

Implementations described herein provide for improved monitoring and alerting with respect to data center operations. In particular, monitoring environments disclosed herein provide for dynamically escalating service conditions based on access conditions related to a data center. In this manner, a service condition may be escalated to an escalated condition and an escalated response initiated thereto. In contrast, a service condition that is not escalated may be responded to by way of a non-escalated response.

In a brief example, large scale failures, and other types of escalated conditions, may be detected from the occurrence of service conditions within a data center and an evaluation of access conditions associated with the data center. Escalated conditions can be attended with escalated responses, while more mundane failures that previously may have triggered escalated responses can be handled in a non-escalated manner.

In some implementations, a monitoring system detects a service condition indicative of a failure of at least one service element within a data center monitored by the monitoring system. The monitoring system determines whether or not the service condition qualifies for escalation based at least in part on an evaluation of an access condition associated with the data center. The monitoring system can carry out the evaluation in a variety of ways, including attempting to access the data center itself. In addition, the monitoring system may communicate with other monitoring systems to inquire as to their ability to access the data center. In such a case, the other monitoring systems may be geographically remote from the monitoring system and possibly the data center. In this manner, the monitoring system can ascertain if the data center is generally inaccessible, which may indicate the occurrence of a large scale failure or some other event that calls for escalated handling. Upon determining that the service condition qualifies for escalation, the monitoring system escalates the service condition to an escalated condition and initiates an escalated response.

Figure 2:
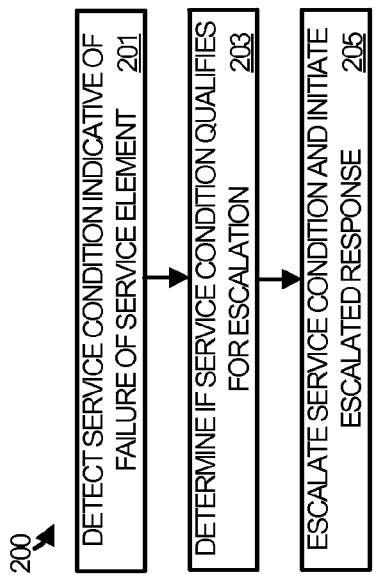
FIG. 2 illustrates a method of operating a monitoring system within a monitoring environment in an implementation.
Figure 1:
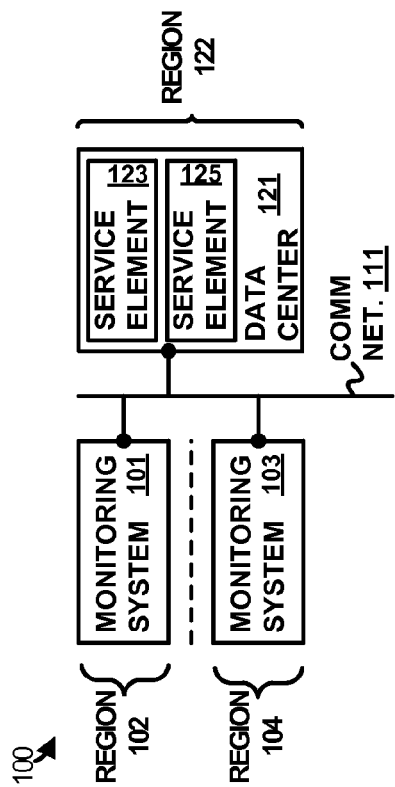
FIG. 1 illustrates a monitoring environment in an implementation.
Figure 3:
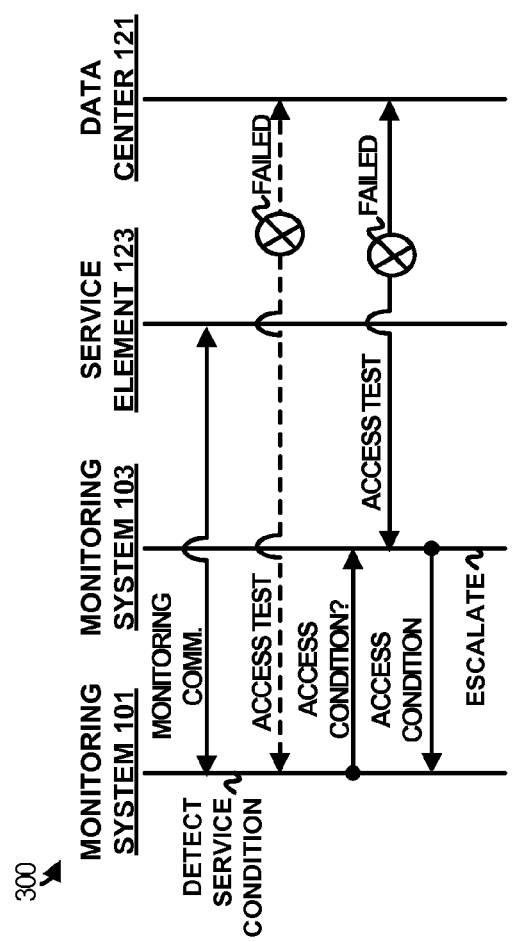
FIG. 3 illustrates a sequence diagram pertaining to operations of a monitoring environment in an implementation.
Figure 4:
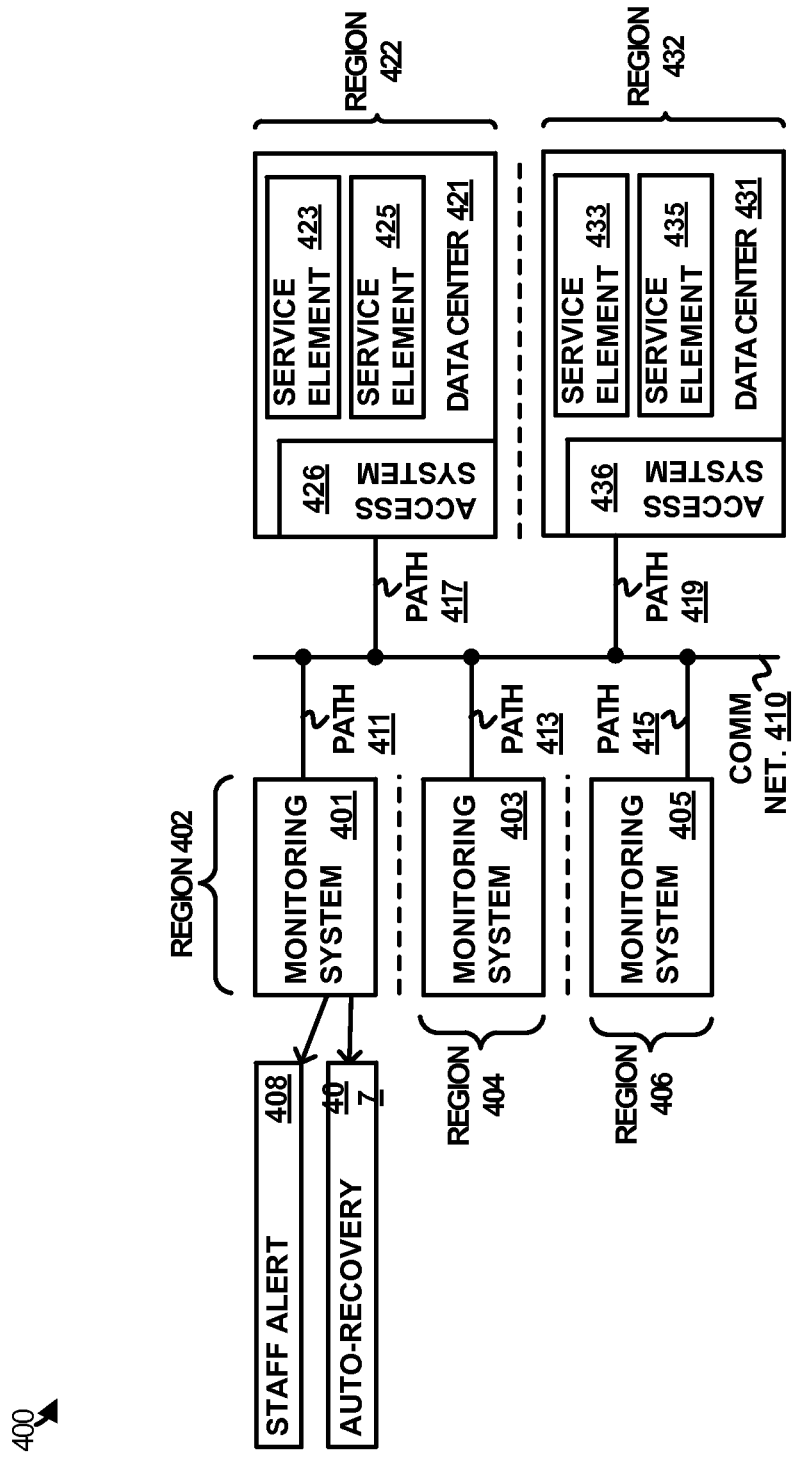
FIG. 4 illustrates another monitoring environment in an implementation.
Figure 9:
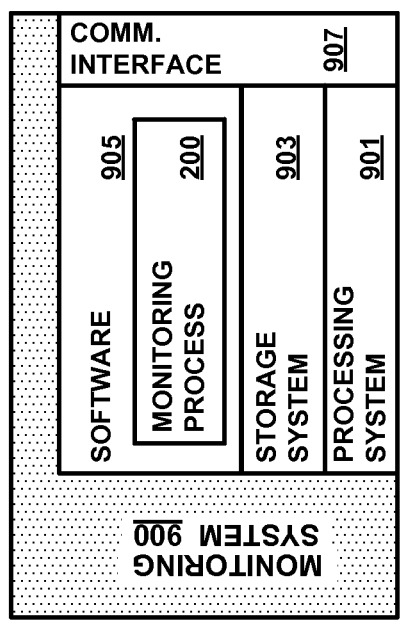
FIG. 9 illustrates a monitoring system in an implementation.

Referring now to the drawings, FIG. 1 illustrates a monitoring environment in which a monitoring process, described in FIG. 2, may be implemented. FIG. 3 illustrates a sequence of operations within the monitoring environment of FIG. 1. FIG. 4 illustrates another monitoring environment, while FIGS. 5-8 generally illustrate the operation of the monitoring environment in FIG. 4. FIG. 9 illustrates a monitoring system representative of those found in the monitoring environments of FIGS. 1 and 4.

Turning to FIG. 1, monitoring environment 100 includes monitoring system 101 and monitoring system 103, located in region 102 and region 104 respectively. Monitoring system 101 and monitoring system 103 are capable of communicating with data center 121, and service elements 123 and 125 within data center 121, over communication network 111. Data center 121 is located in region 122. Regions 102, 104, and 122 are representative of areas sufficiently distinct from each other that the communication path between monitoring system 101 and data center 121 has at least one link or hop not in common with the communication path between monitoring system 103 and data center 121. In some implementations, none of the links in each respective communication path are shared in common between monitoring system 101 and monitoring system 103. Examples of regions 102, 104, and 122 are regions that are geographically distinct from or otherwise different than each other, such as cities, states, provinces, countries, or continents, or any other type of geographically distinguishable region.

Monitoring system 101 is any computing system capable of monitoring at least some aspects of service element 123 or service element 125, or both. Moreover, monitoring system 101 is any computing system capable of detecting and escalating service conditions as will be discussed in more detail with respect to FIG. 2. Similarly, monitoring system 101 is any computing system capable of monitoring at least some aspects of service element 123 or service element 125, or both. Monitoring system 900, discussed in more detail below with respect to FIG. 9, is an example of suitable system for implementing monitoring system 101 and monitoring system 102.

FIG. 2 illustrates monitoring process 200, which may be implemented by either of monitoring system 101 or monitoring system 103. For illustrative purposes, the discussion of FIG. 2 will proceed with respect to an implementation of monitoring process 200 by monitoring system 101.

To begin, monitoring system 101 detects a service condition associated with a service element within data center 121, such as service element 123 or 125 (step 201). Monitoring system 101 may execute various monitoring processes that evaluate information normally provided by service elements 123 and 125. The monitoring processes may be capable of processing the information to generate and report on service conditions associated with service elements 123 and 125. The service condition may be communicated to monitoring system 101 by the service element, and thus is detected by monitoring system 101 upon processing communications indicative of the service condition. However, it should be understood that the service condition may be detected by monitoring system 101 without need for communication with the service element. For example, the monitoring processes may also consider the lack or absence of communication by the service element when generating the service conditions.

Upon detecting the service condition, monitoring system 102 determines whether or not the service condition qualifies for escalation to an escalated condition representative of more than just the failure of a service element (step 203). An escalated condition, relative to a non-escalated condition, may be considered any condition representative of a problem having a greater scale than problems associated with non-escalated conditions. For instance, a date center-wide outage may be considered an escalated condition relative to the failure of just a single server machine within the data center. However, a variety of conditions may be considered escalated conditions. For instance, the failure of a substantial proportion of a data center may be considered an escalated condition. Another distinction between escalated and non-escalated conditions may be the variation in responses to the two kinds of conditions. For instance, an escalated condition may call for a more rapid response than a non-escalated condition. In another example, an escalated condition may result in alerting a greater number of personnel than a non-escalated condition. It should be understood that many conditions may be considered escalated conditions beyond just those provided for exemplary purposes herein.

Monitoring system 102 may make this determination based on a variety of factors, including an evaluation of access to data center 121. The evaluation of access to data center 121 may include testing the access between monitoring system 102 and data center 121, as well as communicating with monitoring system 103 to inquire about the condition of access between monitoring system 103 and data center 121. If the service condition qualifies for escalated handling based on the access condition of data center 121, then the service condition is handled in an escalated manner accordingly (step 203). For example, the service condition may be escalated to an escalated condition and an escalated initiated. However, it is possible that the access condition is such that the service condition is not escalated and can be handled with a non-escalated response.

For example, if monitoring system 101 is able to confirm that data center 121 is accessible, then the service condition need not be escalated. This determination may be made because the service condition can be considered to be caused by a failure or sub-optimal performance of one of service elements 123 or 125, rather than a large scale failure generally impacting access to data center 121. Monitoring system 101 may discover the accessibility of data center 121 by way of an access test performed by monitoring system 101 with respect to data center 121.

In another example, monitoring system 101 may not be able to access data center 121, as discovered by its access test, but monitoring system 103 may report back to monitoring system 101 that data center 121 is accessible. Monitoring system 103 may also discover the accessibility by performing an access test with respect to data center 121. Monitoring system 101 can then determine to handle the service condition in a non-escalated manner based on the access condition of data center 121.

In yet another example, monitoring system 101 may be unable to determine the access condition of data center 121 from either its own access test or the access test performed by monitoring system 103 with respect to data center 121. This may occur when monitoring system 101 is unable to communicate with data center 121 itself, but may also occur when monitoring system 101 is also unable to communicate with monitoring system 103. A communication failure between monitoring system 101 and monitoring system 103 may result in an undetermined access condition of data center 121 since monitoring system 101 is not able to communicate with monitoring system 103.

Under such circumstances, monitoring system 101 may be programmed or otherwise configured to respond in a variety of ways. In one scenario, monitoring system 101 may be configured to escalate the service condition since an inability to communicate with data center 121 and monitoring system 103 may be indicative of a large scale failure that requires escalated attention.

In an alternative scenario, monitoring system 101 may be configured not to escalate the service condition since an inability to communicate with either data center or monitoring system 103 may be indicative of a problem localized to monitoring system 101. For example, a failure may have occurred with respect to communication links incoming to or outgoing from monitoring system 101, inhibiting its ability to communicate, while monitoring system 103 and data center 121 may be operating sufficiently.

In one implementation, a count of service conditions that may indicate a failure of a service element can be tracked. Determining if the service condition qualifies for escalation can occur when the count satisfies a threshold, such as meeting or exceeding a threshold count. In other words, while each single service condition may be evaluated for escalation, the existence of a single such service condition may not justify the resources used to determine if the service condition should be escalated. Rather, the effort may be put forth in response to detecting a certain number, quantity, or volume of service conditions indicative of a failure of various service elements.

FIG. 3 illustrates sequence diagram 300 pertaining to a sequence of operations in monitoring environment 100. As illustrated, monitoring system 101 may exchange monitoring communications with service element 123 during an operational period. For example, service element 123 may report on various operating conditions, such as processor utilization, application usage, and disk usage, as well as other operational parameters that can be monitored. The operating conditions may be communicated to monitoring system 101 in response to queries made by monitoring system 101. However, service element 123 may also push the operational information without prompting or querying by monitoring system 101.

During operation, monitoring system 101 detects a service condition indicative of a failure of service element 123. For example, service element 123 may itself communicate a failure status to monitoring system 101, such as the failure of an application, a hardware element, or some other resource on or associated with service element 123. In another example, service element 123 may fail to communicate with monitoring system 101, represented internally monitoring system 101 as a service condition. In other words, the lack or absence of monitoring communications by service element 123 may be indicative of a failure of service element 123 or any of its component aspects.

In response to detecting the service condition, monitoring system 101 attempts an access test with respect to data center 121 to evaluate whether or not data center 121 can be accessed communicatively by monitoring system 101. In this illustration, the access test fails, representing data center 121 may possibly be inaccessible in general, or that a communication problem has occurred locally with respect to monitoring system 101 inhibiting it from communicating with data center 121.

In order to ascertain whether the access test failed due to a general problem with data center 121 or a localized problem with the communication ability of monitoring system 101, monitoring system 101 initiates a communication with monitoring system 103, located in a geographic area distinct from where monitoring system 101 is located, to determine how monitoring system 103 may observe access to data center 121.

Monitoring system 103 responsively initiates its own access test with respect to data center 121. In this illustration, the access test initiated by monitoring system 103 also fails. Monitoring system 103 communicates the access condition of data center 121, as observed by monitoring system 103, to monitoring system 101 for consideration in the evaluation of whether or not to escalate the service condition. It should be understood that the access test performed by monitoring system 103 may return results different from an access test performed by monitoring system 101 for a variety of reasons. For example, the relative differences or variations inherent to the communication paths linking monitoring system 103 to data center 121 and monitoring system 101 to data center 121 may cause substantially different results. This may especially be the case where at least a portion of one or the other communication path has failed.

Continuing with this illustration, monitoring system 101 is able to evaluate the access condition with respect to data center 121 as determined based on its own access test, such as a ping test, but also the access test performed by monitoring system 103. It should be understood that monitoring system 101 may communicate with other monitoring systems in addition to monitoring system 103. Monitoring system 101 can consider the access condition as reported by each monitoring system when determining whether or not to escalate the service condition.

In this example, the service condition is escalated to an escalated condition. An escalated response is taken to respond to the escalated condition. For example, alerts may be communicated to personnel responsible for responding to escalated conditions. In contrast, had it been determined that the service condition need not be escalated, a non-escalated response may have been chosen to respond to the service condition. For example, a repair or recovery action may have been initiated, or even a wait period initiated, to address the failure of the associated service elements.

Turning to FIG. 4, monitoring environment 400 includes monitoring system 401, monitoring system 403, and monitoring system 405. Monitoring system 401 is located in region 402, while monitoring system 403 and monitoring system 405 are located in region 404 and region 406 respectively. Monitoring environment 400 also includes data center 421 and data center 431. Monitoring systems 401, 403, and 405 are capable of communicating with data center 421 and data center 431 over communication network 410. Data center 421 is located in region 422 and data center 431 is located in region 432.

Regions 402, 404, 406, 422, and 432 are representative of areas sufficiently distinct from each other that the communication path between monitoring systems 401, 403, and 405, and data centers 421 and 423 have at least one unique link or hop included therein. In this way, the result of access tests performed by any one monitoring system may be useful to any other monitoring system when evaluating an access condition associated with a data center. Examples of regions 402, 404, 406, 422, and 432 are any regions that are geographically distinct from or otherwise different than each other, such as cities, states, provinces, countries, or continents, or any other type of geographically distinguishable region. are geographic regions that are geographically distinct from or otherwise different than each other, such as cities, states, provinces, countries, or continents, or any other type of geographically distinguishable region.

Data center 421 includes access system 426, service element 423, and service element 425. Access system 426 provides elements external to data center 421 with access to service elements 423 and 425. For example, monitoring systems 401, 403, and 405 may communicate with service elements 423 and 425 through access system 426. In addition, other computing devices, such as mobile phones, desktop computers, laptop computers, and tablet computers may communicate with elements within data center 421 through access system 426 when engaging with services, applications, or data within data center 421.

Data center 431 includes access system 436, service element 433, and service element 435. Access system 436 provides elements external to data center 431 with access to service element 433 and 435. For example, monitoring systems 401, 403, and 405 may communicate with service elements 423 and 425 through access system 426. In addition, other computing devices, such as mobile phones, desktop computers, laptop computers, and tablet computers may communicate with elements within data center 431 through access system 426 when engaging with services, applications, or data within data center 431.

Communication network 410 may be any network or collections of networks capable of carrying communications between monitoring systems 401, 403, and 405 and data centers 421 and 431. For illustrative purposes, communication network 411 includes paths 411, 413, 415, 417, and 419, which are representative of the various networks, systems, sub-systems, links, or other such segments of communication network 411 used to deliver communications to monitoring systems 401, 403, and 405 located in different geographic regions, regions 402, 404, 406. For instance, communications originating from or destined to monitoring system 401 may traverse path 411, while communications originating from or destined to monitoring system 403 may traverse path 413.

Further illustrated in FIG. 4, monitoring system 401 may include several service modules that can be called in response to a detected service condition, including an auto recovery module 407 and a staff alert module 408. It should be understood that monitoring system 401 may include more or fewer modules than those illustrated herein. In either case, at last two modules may be present that are capable of handling service conditions according to at least an escalated service response and a non-escalated service response. For example, staff alert module 408 may be considered capable of implementing an escalated service response relative to a non-escalated service response implemented by auto-recovery module 407.

FIG. 5 illustrates sequence diagram 500 pertaining to the operation of monitoring environment 400 in an implementation. To begin, monitoring system 401 detects a service condition indicative of a failure of a service element within data center 421. Initially, the service condition may call for a non-escalated response, such as initiating a repair or recovery process provided by auto-recovery module 407. However, monitoring system 401 first determines whether or not to escalate the service condition to an escalated condition by initiating an access test with respect to data center 421. In this example, the access test fails.

The access test may fail for a number of reasons. For instance, path 411 may be degraded or otherwise inoperable, thereby rendering monitoring system 401 incapable of communication with data center 421 and service elements 423 and 425 residing therein. However, the status of path 411 may not yet be ascertained by monitoring system 401. Thus, monitoring system 401 next attempts to communicate with monitoring system 403 and monitoring system 405 to determine the condition of access to data center 421 as determined by each monitoring system 403 and 405 performing its own access test.

As illustrated, both monitoring system 403 and monitoring system 405 are able to successfully perform access tests with respect to data center 421 and determine the access condition therefrom. Accordingly monitoring system 403 and monitoring system 405 communicate their respective views of the access condition to monitoring system 401 for considering in determining whether or not to escalate the service condition.

In this example, monitoring system 401 determines not to escalate the service condition based on the access condition of data center 421 communicated by monitoring systems 403 and monitoring system 405. Note that since monitoring system 403 and monitoring system 405 are able to communicate with data center 421, monitoring system 401 can determine that its inability to communicate with data center 421 may be a localized problem specific to monitoring system 401. The service condition can therefore be handled by auto-recovery module 407 implementing a suitable non-escalated service response.

In an alternative, it is possible that the service condition need not be addressed at all. For example, if it is positively determined that the service condition is caused by a communication fault within or related to monitoring system 401, then it may be that data center 421 is operating sufficiently. In other words, there may be no actual problems associated with service element 423 or service element 425 requiring the attention of either an escalated or non-escalated service response.

In another alternative, the service condition may be addressed by attending to whatever communication fault may have caused the service condition. For example, auto-recovery module 407 may still be called, but it may be in reference to a process or element within monitoring system 401 or aspects of path 411 inhibiting monitoring system 401 from communicating effectively with data center 421.

FIG. 6 illustrates another sequence diagram 600 pertaining to the operation of monitoring environment 400 in an implementation. To begin, monitoring system 401 detects a service condition that requires handling according to a non-escalated service response. To determine whether or not to handle the service condition according to an escalated or non-escalated service response, monitoring system 401 initiates an access test with respect to data center 421. In this example, the access test fails.

The access test may fail for a number of reasons. For instance, path 411 may be degraded or otherwise inoperable, thereby rendering monitoring system 401 incapable of communication with data center 421. However, the status of path 411 may not yet be ascertained by monitoring system 401. Thus, monitoring system 401 next attempts to communicate with monitoring system 403 and monitoring system 405 to determine the condition of access to data center 421 as determined by each monitoring system performing its own access test.

In this illustration, the communications attempted between monitoring system 401 and monitoring systems 403 and 405 also fail, rendering monitoring system 401 unable to learn of the condition of access to data center 421 as observed by monitoring system 403 and 405. Since monitoring system 401 is unable to evaluate the condition of access to data center 421, the service condition is escalated. Staff alert module 408 is called, thereby launching alerts to on-call personnel or other staff identified as responsible for the service condition. For instance, automated phone calls, pages, or emails may be generated and transmitted informing the personnel about the service condition.

FIG. 7 illustrates another sequence diagram 700 pertaining to the operation of monitoring environment 400 in another implementation. To begin, monitoring system 401 detects a service condition that requires handling according to a service response. To determine whether or not to handle the service condition according to an escalated or non-escalated service response, monitoring system 401 initiates an access test with respect to data center 421. In this example, the access test fails.

The access test may fail for a number of reasons. For instance, path 411 may be degraded or otherwise inoperable, thereby rendering monitoring system 401 incapable of communication with data center 421. However, the status of path 411 may not yet be ascertained by monitoring system 401. Thus, monitoring system 401 next attempts to communicate with monitoring system 403 and monitoring system 405 to determine the condition of access to data center 421 as determined by each monitoring system performing its own access test.

As illustrated, monitoring system 403 is able to successfully perform an access test with respect to data center 421 and determine the access condition therefrom. Accordingly monitoring system 403 communicates its respective view of the access condition, accessible, to monitoring system 401 for considering in determining whether or not to escalate the service condition. However, monitoring system 405 is unable to successfully perform an access test with respect to data center 421. This may occur due to a variety of reasons, including an operational fault internal to monitoring system 405 or a communication fault on path 415 or path 417, as well as for any number of other reasons. Thus, monitoring system 405 communicates the access condition of data center 421 as inaccessible.

In this example, monitoring system 401 determines not to escalate the service condition based on the access condition of data center 421 communicated by monitoring systems 403 and monitoring system 405. Note that, since monitoring system 403 is able to communicate with data center 421, monitoring system 401 can determine that its inability to communicate with data center 421 may be a localized problem specific to monitoring system 401 or monitoring system 403. The service condition can therefore be handled by auto-recovery module 407 implementing a suitable non-escalated service response.

In an alternative, it is possible that the service condition need not be addressed at all. For example, if it is determined that the service condition is caused by a communication fault within or related to monitoring system 401 or monitoring system 405, then it may be that data center 421 is operating sufficiently. In other words, there may be no actual problems associated with service element 423 or service element 425 requiring the attention of either an escalated or non-escalated service response.

In another alternative, the service condition may be addressed by attending to whatever communication fault may have caused the service condition. For example, auto-recovery module 407 may still be called, but it may be in reference to a process or element within monitoring system 401 or aspects of path 411 inhibiting monitoring system 401 from communicating effectively with data center 421.

FIG. 8 illustrates another sequence diagram 800 pertaining to the operation of monitoring environment 400 in an implementation. To begin, monitoring system 401 detects a service condition that requires handling according to a service response. To determine whether or not to handle the service condition according to an escalated or non-escalated service response, monitoring system 401 initiates an access test with respect to data center 421. In this example, the access test fails.

The access test may fail for a number of reasons. For instance, path 411 may be degraded or otherwise inoperable, thereby rendering monitoring system 401 incapable of communication with data center 421. However, the status of path 411 may not yet be ascertained by monitoring system 401. Thus, monitoring system 401 next attempts to communicate with monitoring system 403 and data center 431 to determine the condition of access to data center 421.

In this illustration, the communications attempted between monitoring system 401 and monitoring system 403, and between monitoring system 401 and data center 431, fail, rendering monitoring system 401 unable to learn of the condition of access to data center 421 as observed by either monitoring system 403 or data center 431. Since monitoring system 401 is unable to evaluate the condition of access to data center 421, the service condition is escalated. Staff alert module 408 is called, thereby launching alerts to on-call personnel or other staff identified as responsible for the service condition. For instance, automated phone calls, pages, or emails may be generated and transmitted informing the personnel about the service condition.

Referring now to FIG. 9, a monitoring system 900 suitable for implementing monitoring process 200 is illustrated. Monitoring system 900 is generally representative of any computing system or systems suitable for implementing a monitoring system, such as monitoring system 101, 103, 411, 413, and 415. Examples of monitoring system 900 include any suitable computer or computing system, including server computers, virtual machines, computing appliances, and distributed computing systems, as well as any other combination or variation thereof.

Monitoring system 900 includes processing system 901, storage system 903, software 905, and communication interface 907. Processing system 901 is operatively coupled with storage system 903 and communication interface 907. Processing system 901 loads and executes software 905 from storage system 903, including monitoring process 200. When executed by monitoring system 900 in general, and processing system 901 in particular, software 905 directs monitoring system 900 to operate as described herein for monitoring process 200.

Monitoring system 900 may optionally include additional devices, features, or functionality. For example, monitoring system 900 may optionally have input devices, such as a keyboard, a mouse, a voice input device, a touch input device, a gesture input device, or other comparable input devices. Output devices such as a display, speakers, printer, and other types of comparable input devices may also be included. These devices are well known in the art and need not be discussed at length here.

Referring still to FIG. 9, processing system 901 may comprise a microprocessor and other circuitry that retrieves and executes software 905 from storage system 903. Processing system 901 may be implemented within a single processing device but may also be distributed across multiple processing devices or sub-systems that cooperate in executing program instructions. Examples of processing system 901 include general purpose central processing units, application specific processors, and logic devices, as well as any other type of processing device, combinations of processing devices, or variations thereof.

Storage system 903 may comprise any storage media readable by processing system 901 and capable of storing software 905. Storage system 903 may include volatile and nonvolatile, removable and non-removable media implemented in any method or technology for storage of information, such as computer readable instructions, data structures, program modules, or other data. Storage system 903 may be implemented as a single storage device but may also be implemented across multiple storage devices or sub-systems. Storage system 903 may comprise additional elements, such as a controller, capable of communicating with processing system 901.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software 905 includes monitoring process 200 which may be implemented in program instructions that, when executed by monitoring system 900, direct monitoring system 900 to detect service conditions, evaluate access conditions with respect to a data center, and determine whether or not to escalate the service conditions based on the access conditions.

Software 905 may include additional processes, programs, or components in addition to monitoring process 200, such as operating system software or other application software. Software 905 may also comprise firmware or some other form of machine-readable processing instructions capable of being executed by processing system 901.

In general, software 905 may, when loaded into processing system 901 and executed, transform processing system 901, and monitoring system 900 overall, from a general-purpose computing system into a special-purpose computing system customized to facilitate dynamic escalation of service conditions as described herein for each implementation. Indeed, encoding software 905 on storage system 903 may transform the physical structure of storage system 903. The specific transformation of the physical structure may depend on various factors in different implementations of this description. Examples of such factors may include, but are not limited to the technology used to implement the storage media of storage system 903 and whether the computer-storage media are characterized as primary or secondary storage.

For example, if the computer-storage media are implemented as semiconductor-based memory, software 905 may transform the physical state of the semiconductor memory when the program is encoded therein. For example, software 905 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Through the operation of monitoring system 900 employing software 905, transformations may be performed with respect to monitoring process 200. As an example, monitoring system 900 could be considered transformed from one state to another by the handling of service conditions. In a first state, a service condition may be detected that would normally call for handling with a non-escalated service response. Upon determining a particular access condition of a data center, it may be determined that the service condition should be escalated to an escalated condition and requires handling with an escalated service response, thereby changing monitoring system 900 to a second, different state.

Referring again to FIG. 9, communication interface 907 may include communication connections and devices that allow for communication between monitoring system 900 and other monitoring systems and data centers over a communication network. For example, monitoring system 101 communicates with monitoring system 103 and data center 121 over communication network 111. Examples of connections and devices that together allow for inter-system communication include network interface cards, antennas, power amplifiers, RF circuitry, transceivers, and other communication circuitry. The aforementioned network, connections, and devices are well known and need not be discussed at length here.

In an operational scenario involving a data center hosting instances of an application, a monitoring system external to the data center may detect an application condition, of several application conditions monitored by the monitoring system, indicative of a failure of at least one instance of the application running within the data center. The monitoring system responsively determines if the application condition qualifies for escalation based at least in part on an access condition associated with the data center identified by another monitoring system located in a geographic region distinct from that of the monitoring system. Upon determining that the service condition qualifies for escalation, the monitoring system escalates the service condition from the application condition to a data center condition indicative of a large scale failure of the data center.

Upon determining that the service condition qualifies for escalation, the monitoring system may initiate an escalated response to the data center condition. In addition, upon determining that the service condition does not qualify for escalating, the monitoring system may initiate a non-escalated response to the service condition.

Optionally, initiating the escalated response to the data center condition may include generating and transmitting notifications of the large scale failure of the data center for presentation to personnel responsible for handling the large scale failure of the data center. Initiating the non-escalated response may involve initiating a repair or a recovery of the instance of the application and, responsive to a failure of the repair or the recovery of the instance of the application, generating and transmitting a notification of the failure of the instance of the application to personnel responsible for handling the failure of the instance of the application.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for dynamically escalating service conditions associated with data center operations, the method comprising:
   detecting at least a service condition, of a plurality of service conditions monitored by at least a first monitoring system, indicative of a failure of at least a service element of a plurality of service elements within a data center;
   determining if the service condition qualifies for escalation based at least in part on an access condition associated with the data center identified by at least a second monitoring system located in a geographic region distinct from that of the first monitoring system, wherein the access condition is indicative of an accessibility between the second monitoring system and the data center;
   upon determining that the service condition qualifies for escalation, escalating the service condition to an escalated condition and initiating an escalated response to the escalated condition.

2. The method of claim 1 further comprising upon determining that the service condition does not qualify for escalating, initiating a non-escalated response to the service condition.

3. The method of claim 1 further comprising transferring a request for the access condition from the first monitoring system for delivery to the second monitoring system, responsively initiating an access test in the second monitoring system to determine the access condition, and transferring a reply indicative of the access condition as determined by the access test for consideration in determining if the service condition qualifies for escalation.

4. The method of claim 3 further comprising transferring another request for the access condition from the first monitoring system for delivery to a third monitoring system, responsively initiating another access test in the third monitoring system to determine the access condition, and transferring another reply indicative of the access condition as determined by the another access test for consideration in determining if the service condition qualifies for escalation.

5. The method of claim 4 further comprising responsive to detecting the service condition, initiating an initial access test in the first monitoring system to determine the access condition associated with the data center, and wherein transferring the request for the access condition from the first monitoring system for delivery to the second monitoring system comprises transferring the request in response to a result of the initial access test indicating the access condition as inaccessible or undetermined.

6. The method of claim 1 wherein determining if the service condition qualifies for escalation occurs when a count of any of the plurality of service conditions that indicate failures of any of the plurality of service elements satisfies a threshold, and wherein the escalated condition comprises a large scale failure of the data center.

7. The method of claim 1 wherein each of the plurality of service elements comprises an instance of an application hosted within the data center and wherein the plurality of service conditions comprise an absence of responses by the service element to queries initiated by the first monitoring system related to performance of the service element.

8. The method of claim 1 wherein each of the plurality of service elements comprises an instance of an application hosted within the data center and wherein the plurality of service conditions comprises an absence of reporting related to performance of the service element scheduled to be generated and transferred by the service element to the first monitoring system.

9. One or more computer readable storage devices having stored thereon program instructions for dynamically escalating service conditions, wherein the program instructions, when executed by a first monitoring system, direct the first monitoring system to at least:
   detect at least a service condition, of a plurality of service conditions monitored by at least the first monitoring system, indicative of a failure of at least a service element of a plurality of service elements within a data center;
   determine if the service condition qualifies for escalation based at least in part on an access condition associated with the data center identified by at least a second monitoring system located in a geographic region distinct from that of the first monitoring system, wherein the access condition is indicative of an accessibility between the second monitoring system and the data center;
   upon determining that the service condition qualifies for escalation, escalate the service condition to an escalated condition and initiate an escalated response to the escalated condition.

10. The one or more computer readable storage devices of claim 9 wherein the program instructions further direct the first monitoring system to initiate a non-escalated response to the service condition upon determining that the service condition does not qualify for escalation.

11. The one or more computer readable storage devices of claim 9 wherein the program instructions, when executed by the first monitoring system, further direct the first monitoring system to transfer a request for the access condition for delivery to the second monitoring system to initiate an access test to determine the access condition, and receive a reply indicative of the access condition as determined by the access test for consideration in determining if the service condition qualifies for escalation.

12. The one or more computer readable storage devices of claim 11 wherein the program instructions, when executed by the first monitoring system, further direct the first monitoring system to transfer another request for the access condition for delivery to a third monitoring system to initiate another access test to determine the access condition, and receive another reply indicative of the access condition as determined by the another access test for consideration in determining if the service condition qualifies for escalation.

13. The one or more computer readable storage devices of claim 12 wherein the program instructions, when executed by the first monitoring system, further direct the first monitoring system to, responsive to detecting the service condition, initiate an initial access test to determine the access condition associated with the data center, and wherein direct the first monitoring system to transfer the request for the access condition for delivery to the second monitoring system in response to a result of the initial access test indicating the access condition as inaccessible or undetermined.

14. The one or more computer readable storage devices of claim 9 wherein the program instructions, when executed by the first monitoring system, direct the first monitoring system to determine if the service condition qualifies for escalation in response to when a count of any of the plurality of service conditions that indicate failures of any of the plurality of service elements satisfies a threshold, and wherein the escalated condition comprises a large scale failure of the data center.

15. The one or more computer readable storage devices of claim 9 wherein each of the plurality of service elements comprises an instance of an application hosted within the data center and wherein the plurality of service conditions comprise an absence of responses by the service element to queries initiated by the first monitoring system related to performance of the service element.

16. The one or more computer readable storage devices of claim 9 wherein each of the plurality of service elements comprises an instance of an application hosted within the data center and wherein the plurality of service conditions comprise an absence of reporting related to performance of the service element scheduled to be generated and transferred by the service element to the first monitoring system.

17. A method of operating a monitoring system in a monitoring environment to dynamically escalate service conditions associated with data center operations, the method comprising:
- detecting at least an application condition, of a plurality of application conditions monitored by at least the monitoring system, indicative of a failure of at least an instance of an application of a plurality of instances of the application running within a data center;
- determining if the application condition qualifies for escalation based at least in part on an access condition associated with the data center identified by at least another monitoring system located in a geographic region distinct from that of the monitoring system, wherein the access condition is indicative of an accessibility between the second monitoring system and the data center;
- upon determining that the application condition qualifies for escalation, escalating the application condition from the application condition to a data center condition indicative of a large scale failure of the data center.

18. The method of claim 17 further comprising:
- upon determining that the application condition qualifies for escalation, initiating an escalated response to the data center condition; and
- upon determining that the application condition does not qualify for escalating, initiating a non-escalated response to the application condition.

19. The method of claim 18 wherein initiating the escalated response to the data center condition comprises generating and transmitting notifications of the large scale failure of the data center for presentation to personnel responsible for handling the large scale failure of the data center.

20. The method of claim 19 wherein initiating the non-escalated response comprises initiating a repair or a recovery of the instance of the application and, responsive to failure of the repair or the recovery of the instance of the application, generating and transmitting a notification of the failure of the instance of the application to personnel responsible for handling the failure of the instance of the application.

* * * * *